United States Patent [19]

Pomerleau et al.

[11] 4,411,801

[45] Oct. 25, 1983

[54] LOW SOLIDS WELL SERVICING FLUIDS

[75] Inventors: Daniel G. Pomerleau, Calgary; Douglas E. Slocombe, Millarville; Kenneth H. Watts, Calgary, all of Canada

[73] Assignee: NL Industries, Inc., New York, N.Y.

[21] Appl. No.: 303,154

[22] Filed: Sep. 17, 1981

[51] Int. Cl.$^3$ .................................................. C09K 7/02
[52] U.S. Cl. ............................ 252/8.5 P; 252/8.55 R; 252/356
[58] Field of Search ............. 252/8.5 P, 8.5 C, 8.55 R

[56] References Cited

U.S. PATENT DOCUMENTS

| | | | |
|---|---|---|---|
| 3,062,740 | 11/1962 | Reddie et al. | 252/8.5 |
| 3,150,085 | 9/1964 | Mallory | 252/8.5 |
| 3,396,105 | 8/1968 | Burdyn et al. | 252/8.5 |

FOREIGN PATENT DOCUMENTS 743476  9/1966  Canada .................................. 252/8.5

*Primary Examiner*—Herbert B. Guynn
*Attorney, Agent, or Firm*—Browning, Bushman, Zamecki & Anderson

[57] ABSTRACT

An emulsifying composition for preparing low solids drilling fluids containing a mixture of polyoxyethylene glycol 500 mono-tallate, nonyl phenol ethoxylate containing approximately 43% by weight of oxyethylene groups and nonyl phenol ethoxylate containing approximately 65% by weight of oxyethylene groups; a well servicing fluid comprising an aqueous medium, a liquid hydrocarbon coating agent and an emulsifying amount of the emulsifying compositions; and a method of servicing a well during drilling, fracturing and completing operations.

17 Claims, No Drawings

LOW SOLIDS WELL SERVICING FLUIDS

BACKGROUND OF THE INVENTION

The present invention relates to compositions and fluids for use in drilling, fracturing and completing operations and, more particularly, to oil-in-water emulsion well serving fluids.

In the drilling or the treatment of earth boreholes such as oil and gas wells, fluids or muds find an important use. For example, in the rotary drilling of wells, a drilling fluid is continuously circulated from the surface of the ground to the bottom of the well borehole and back to the surface of the ground again. The drilling fluid has various functions including those of lubricating the drill bit and pipe, carrying cuttings from the bottom of the well borehole to the surface of the ground, and imposing a hydrostatic head in the drilled formation to prevent escape of oil, gas, or water therefrom into the well borehole during the drilling operation. Ordinarily, aqueous drilling fluids comprising a suspension of a clay in water are employed. However, in certain cases such aqueous drilling fluids can be particularly disadvantageous.

It is not uncommon, depending on the area in which the drilling is being conducted, to encounter subterranean formations made up primarily of hydratable shales, silts or clays. When such hydratable materials are contacted with an aqueous based drilling fluid, they tend to rapidly disperse in the aqueous drilling fluid. The dispersion of the shale or clay into the drilling fluid results in damage to the borehole wall, increases the solids content of the returning drilling fluid, and makes it difficult to remove the dispersed solids from the drilling fluid. Also if shales and clays are wetted by the aqueous drilling fluid they will tend to form a sludge in the fluid, raising its viscosity.

It is common, in an attempt to overcome the disadvantages of water based drilling fluids, to employ drilling fluids having a fluid phase consisting entirely of oil or an emulsion of oil-in-water. Of these two types, the emulsion drilling fluids are usually preferred. Oil-in-water emulsion drilling fluids have been used extensively. In such drilling fluids, water, the predominant liquid component, is the continuous phase of the emulsion while the oil, dispersed in the water phase, is the internal phase of the emulsion. It is known to use certain oil-in-water emulsions containing, for example a blended anionic-non-ionic emulsifier, for drilling through hydratable shale or clay formations. Such emulsions, to some extent, inhibit surface hydration of the formations preventing damage to the wall of the well bore and dispersion of the cuttings in the returning drilling fluids.

SUMMARY OF THE INVENTION

It is therefore an object of the present invention to provide an improved oil-in-water emulsion well servicing fluid.

Another object of the present invention is to provide a low solids, emulsion drilling fluid which is effective in coating the wall of the well bore and impeding hydration of susceptible formation materials.

A further object of the present invention is to provide a composition useful in the preparation of oil-in-water emulsion well servicing fluids.

Still another object of the present invention is to provide an improved method of servicing a well during drilling, fracturing or completing operations.

The above and other objects of the invention will become apparent from the description given below and the appended claims.

In one aspect, the present invention comtemplates an emulsifying composition or agent comprised of (a) polyoxyethylene glycol 500 mono-tallate (b) nonyl phenol ethoxylate containing about 43% by weight oxyethylene (EtO) groups, and (c) nonyl phenol ethoxylate containing about 65% by weight oxyethylene groups, useful in preparing oil-in-water emulsion well servicing fluids.

In another embodiment of the present invention, there is provided a well servicing fluid comprising an aqueous medium, at least about 5% by volume of a liquid hydrocarbon coating agent, and an emulsifying amount of the emulsifying composition described above.

In yet another embodiment of the present invention, there is provided an improved method of servicing a well during drilling, fracturing or completing operations comprising circulating in the well bore the well servicing fluid described above.

DESCRIPTION OF PREFERRED EMBODIMENTS

The emulsifying composition or agent of the present invention contains a mineral oil and a mixture of three different surface active agents (surfactants).

The emulsifying composition is comprised of three different commercially available, surfactants which are present in generally equal amounts, i.e. roughly 33.3% by volume. One of the surfactants is polyoxyethylene glycol 500 mono-tallate which is, generally, the mono esters of tall oil fatty acids and mixed polyoxyethelene diols having an average polymer length of about 450 to 550 oxyethylene (EtO) units. Another of the surfactants employed in the emulsifying composition of the present invention is a nonyl pheno ethoxylate containing about 43% by weight EtO groups. The third surfactant employed in the emulsifying composition of the present invention is a nonyl phenol ethoxylate containing 65% by weight EtO groups.

In preparing the emulsifying compositions of the present invention, the surfactants are first, preferably, blended together by conventional techniques and then can be diluted with a mineral oil.

Using the emulsifying composition described above, ideal oil-in-water emulsion well servicing fluids can be prepared by admixing an emulsifying amount of the emulsifying composition or agent with a suitable aqueous medium and a liquid hydrocarbon coating agent, the liquid hydrocarbon coating agent being present in an amount of at least about 5% by volume of the well servicing fluid. Preferably, the liquid hydrocarbon coating agent will be present in the well servicing fluids in amounts of from about 5 to about 35 by volume. The liquid hydrocarbon coating agent can be virtually any hydrocarbon liquid or mixture thereof derived from the refining of petroleum, the destructive distillation of coal, coal liquification processes, shale oil recovery processes or the like. Preferably the mineral oil is of a type which contains primarily aliphatic hydrocarbons, and has a boiling point in the range of from about 300° to about 900° F. Non-limiting examples of such mineral oils include light crude oil, certain napthas, kerosene, fuel oil, gas oil, light lubricating oil, coal oil, diesel oil, light shale oil, pure or mixed liquid aliphatic hydrocarbons boiling in the specified range, and mixtures of any of the above. A preferred mineral oil, because of its ready availability, is diesel oil. Thus, any liquid hydrocarbons having the characteristics noted above can serve as a liquid hydrocarbon coating agent.

In preparing the well servicing fluids of the present invention, and as noted above, an emulsifying amount of the emulsifying composition is employed. An "emulsifying amount", as used herein, is intended to mean a volume amount of the emulsifying composition sufficient to form a substantially stable oil-in-water emulsion with a given amount of liquid hydrocarbon coating agent present. Thus, it will be seen that the amount of emulsifying agent will vary with the amount of liquid hydrocarbon coating agent employed. Generally however the emulsifying composition will be present in the well servicing fluids in amounts of from about 0.1 to about 3%, by volume, when the coating agent is present in amounts of from about 5 to about 35%, by volume. As pointed out above, the liquid hydrocarbon coating agent should be present in the well servicing fluid in an amount of at least about 5% by volume. Greater amounts, i.e. 10–15% by volume, can be employed with, as noted, a concommitantly higher utilization of emulsifying agent being likewise employed.

The aqueous medium used in preparing the well servicing fluid of the present invention can comprise fresh water or brines such as sodium chloride solutions, calcium chloride solutions, potassium chloride solutions, calcium sulfate solutions, mixture of such solutions, etc. Generally speaking, however, it is preferrably potassium chloride solutions in which the potassium chloride is present in amounts of about 0.5 lbs/gal (ppg) to saturation (2.5 lbs/gal).

Well servicing fluids prepared in accordance with the present invention have some enhanced viscosity as compared to totally aqueous based systems. If further viscosity enhancement is desired, it can be accomplished using well known viscosifiers such as for example starches and starch derivatives, e.g. converted starches; water-dispersible cellulose derivatives; polysaccharide gums, etc. Specific examples of each viscosifiers include carboxyalkyl cellulose ethers, hydroxyalkyl cellulose ethers, carboxymethyl starch, xanthomonas (xanthan) gum (XC polymer) galactomannan gums. Such viscosifiers will generally be present in amounts of from about 0.005 to about 0.02 ppg.

It should be noted that clay type viscosifying agents such as bentonite, prehydrated bentonite or other such hydratable clays commonly used as viscosifiers in water based drilling fluids will not work in the well servicing fluids of the present invention since they become oilwet or coated, will not disperse in the fluid and, in effect, become a solid in the system resulting in a solid-liquid two phase system, e.g. a slurry.

Likewise, if filtration control is desired, in the well servicing fluids, well known water loss control additives such as DEXTRID (Trademark of processed starch with biocide sold by NL Baroid, Houston, Tex.), DRISPAC (Trademark of a carboxymethyl cellulose sold by NL Baroid, Houston, Tex.), IMPERMEX (Trademark of pre-gelatinized starch sold by NL Baroid, Houston, Tex.) can be added. When such fluid loss additives are used, they will generally be present in amounts of from about 0.05 to about 0.25 ppg.

While the well servicing fluids of the present invention find particular use in earth borehole drilling such as in the drilling of oil and gas wells in which the well servicing fluids are circulated down through the drill string and return up the annulus between the drill string and well bore, they are also useful in other well treatment applications where the fluids contact formations with water wettable or hydratable shales, salts and clays. Thus, the well servicing fluids can be used in fracturing operations, completing operations and the like. Because the hydrocarbon coating agent tends to coat or insulate the hydratable shale or clays from water contact, there is reduced sloughing off of the wall of the borehole thereby ensuring the integrity of the borehole wall.

It is preferrable that the pH of well servicing fluid of the present invention be maintained in a range of from about 8 to about 12, preferably about 10. Such pH control can easily be achieved by the addition of a suitable amount of caustic, KOH, MgO, etc. to the well servicing fluid.

The well servicing fluid prepared in accordance with the present invention has many distinct advantages. Since it almost completely inhibits dispersion of hydratable cuttings, conventional shale shakers, i.e. those utilizing 100–120 mesh screens, can remove 70 to 90% of the solids present in the returning fluid. Also, since the well servicing fluid oil wets surfaces, it places a protective coating on pipes and other equipment used to handle the fluid thereby reducing corrosion rates. Due to the lack of hydration and hence inhibited dispersion of hydratable solids encountered in the formation, the cuttings returning to the surface, are larger in particle size. This enables solids control equipment to more effectively remove drill solids from the drilling fluid. Indeed, it was found in a 12 and $\frac{1}{4}$"—500 m test section of a well through very reactive (easily hydratable and dispersable) formations, that a maximum solids content of less than 2% by weight was maintained using only one double decked shale shaker. The shale shaker was equipped with a 100 mesh screen on top and a 120 mesh screen on the bottom. With improved solids removal, dumping of settling tanks, sand traps, shaker tanks and associated volumes are drastically reduced resulting in a substantial decrease in sump size.

Since the cuttings present in the returned well drilling fluids of the present invention are oil wet, they weigh less and therefore have a decreased slip velocity which results in increased hole cleaning capability over typical aqueous based drilling muds, so called "clear water fluids". Washed out sections of the bore hole are minimized and, therefore, the carrying capacity of the fluid is sufficient to adequately clean the hole without increasing the viscosity. However, as noted, if increased carrying capacity and hence higher viscosity is desired, it can be achieved using various, well known viscosifying agents.

The well servicing fluids of the present invention also appear to extend bit life due to the oil wetting nature of the fluid. Additionally, bit balling is eliminated as both drilled solids (cuttings) and the bit are oil wet.

To more fully illustrate the present invention, the following non-limiting examples are presented. In the following examples, the term U.L.S. Product refers to an emulsifying composition of the present invention containing, by volume, 50% diesel oil and 50% of a mixture of equal amounts of (1) polyoxyethylene glycol 500 mono-tallate (b) nonyl phenol ethoxylate (43% EtO) (c) nonyl phenol ethoxylate (65% EtO):

Example 1

Specimens of a typical hydratable, dispersable clay, bentonite, were prepared by mixing 150 grams of AQUAGEL (Trademark of a gel forming bentonite clay marketed by NL Baroid, Houston, Tex.) and 250 ml of water and forming the mixture into balls of approximately 1.5 inch diameter. Various test fluids, in 350 ml volumes, and a test ball were placed in rolling cells and rolled for 16 hours at 150° F. Following the rolling, changes in size, weight and consistency of the test ball were determined. The test fluid compositions and qualitative results are given in Table 1 below.

| Test | Test Fluid | Condition of Test Balls After Rolling |
|---|---|---|
| 1 | 15 ppb aqueous KCl 0.5 ppb HS[1] polymer pH 10 | Some protection from hydration was observed |
| 2 | 15 ppb aqueous KCl 0.5 ppb HS Polymer 5% (v/v) diesel oil 0.5% (v/v) Trimulso[2] pH 10 | Some protection from hydration was observed |
| 3 | 15 ppb aqueous KCl 0.5 ppb HS Polymer 5% (v/v) diesel oil 0.5% (v/v) U.L.S. Product | Some protection from hydration was observed (HS Polymer competes with and interferes with U.L.S. Product stabilization) |
| 4 | 15 ppb aqueous KCl 0.5% (v/v) U.L.S. Product 5% (v/v) diesel pH 10 | Significant hydration protection was observed |

[1] 30% hydrolysed polyacrylamide (polyacrylamide - polyacrylate copolymer)
[2] Trademark of a blended anionic-non-ionic emulsifier marketed by NL Baroid, Houston, Texas The procedure of Example 1 was followed using a test fluid containing 30 ppg aqueous KCl (adjusted to a pH of 10 with caustic), 5% by volume diesel oil and various amounts of the U.L.S. Product. The results are set forth qualitatively in Table 2 below.

| Vol. U.L.S. Product | 0.5 | 0.75 | 1.0 |
|---|---|---|---|
| Condition of Test Balls After Rolling | Significant hydration protection observed | Significant hydration protection observed | Significant hydration protection observed but ball softening noted |

Softening of the test ball in the drilling fluid containing 1% of the emulsifying agent is a result of total oil consumption. This shows that it is imperative that sufficent coating agent (oil) be present in the well drilling fluid at all times to avoid such oil absorption. This can be accomplished by using higher, initial amounts of coating agent or addition thereof during use.

EXAMPLE 3

The procedure of Example 2 was followed except that the test fluids contained 1% (v/v) of the emulsifying agent and varying amounts of diesel oil. The qualitative results are shown in Table 3 below.

| Vol. % Diesel Oil | 7.5 | 10.0 |
|---|---|---|
| Condition of Test Ball After Rolling | Significant hydration protection observed | Significant hydration protection observed |

EXAMPLE 4

For comparison purposes, the procedure of Example 1 was followed using an invert emulsion test fluid. It was noted that the test ball hardened and shrunk due to osmotic dehydration.

Fluoroscopic examination of test balls has revealed that so called invert emulsion drilling fluids (water-in-oil) and the oil-in-water compositions of the present invention provide similar oil wetting characteristics. This is a significant finding since invert emulsion drilling fluids, unlike the fluids of the present invention are generally more costly and present greater environmental handling problems. Moreover such invert fluids vary widely in viscosity with temperature changes and, because they are flammable, can be hazardous to use.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalence of the claims are therefore intended to be embraced therein.

We claim:

1. An emulsifying composition comprised of a mixture of approximately equal amounts of (a) polyoxyethylene glycol 500 monotallate, (b) nonyl phenol ethoxylate containing approximately 43% by weight of oxyethylene groups and (c) nonyl phenol ethoxylate containing approximately 65% by weight of oxyethylene groups, for use in preparing low solids drilling fluids.

2. A low solids oil-in-water emulsion well servicing fluid, substantially free of added clay-type viscosifying agents, comprising an aqueous medium, at least 5% by volume of a liquid hydrocarbon coating agent and an emulsifying amount of the emulsifying composition of claim 1.

3. The well servicing fluid of claim 2 wherein said aqueous medium comprises of brine.

4. The well servicing fluid of claim 3 wherein said brine comprises a potassium chloride solution.

5. The well servicing fluid of claim 2 wherein said coating agent comprises diesel oil.

6. The well servicing fluid of claim 2 wherein said coating agent comprises light crude oil.

7. The well servicing fluid of claim 2 wherein said coating agent is present in an amount of from about 5 to about 35%.

8. The well servicing fluid of claim 2 wherein said emulsifying agent is present in an amount of from about 0.1 to about 3% by volume.

9. In a method of servicing an earth borehole during drilling, fracturing and completing operations, the step comprising circulating in said borehole during said servicing the well servicing fluid of claim 2.

10. The method of claim 9 wheein said aqueous medium comprises a brine.

11. The method of claim 10 wherein said brine comprises a potassium chloride solution.

12. The method of claim 9 wherein said coating agent comprises diesel oil.

13. The method of claim 9 wherein said coating agent comprises light crude oil.

14. The method of claim 9 wherein said coating agent is present in an amount of from about 5 to about 35%.

15. The method of claim 9 wherein said emulsifying agent is present in an amount of from about 0.1 to about 3% by volume.

16. The well servicing fluid of claim 2 wherein said coating agent contains primarily aliphatic hydrocarbons.

17. The method of claim 9 wherein said coating agent contains primarily aliphatic hydrocarbons.

* * * * *